May 22, 1956   E. EGER   2,746,812
PNEUMATIC TRACK

Filed March 9, 1953   2 Sheets-Sheet 1

INVENTOR.
ERNST EGER
BY
Irwin M. Lewis
ATTORNEY.

May 22, 1956 E. EGER 2,746,812
PNEUMATIC TRACK
Filed March 9, 1953 2 Sheets-Sheet 2

*INVENTOR.*
ERNST EGER
BY Irwin M. Lewis
ATTORNEY.

United States Patent Office 2,746,812
Patented May 22, 1956

2,746,812

PNEUMATIC TRACK

Ernst Eger, Los Angeles, Calif., assignor to United States Rubber Company, New York, N. Y., a corporation of New Jersey Application March 9, 1953, Serial No. 341,084

6 Claims. (Cl. 305—10)

This invention relates to a track for track laying vehicles. More particularly, it relates to an inflatable, pneumatic track adapted to be trained around spaced wheels of trucks, tanks, airplanes and other types of vehicles on which tracks are used.

It is important in tracks that the neutral axis, i. e., the axis about which the track bends in passing around the wheels of the vehicle on which it is used, be as near the base of the track as possible. If the neutral axis is not near the base of the track, the base of the track will buckle as it passes around the wheels of the vehicle on which it is used, thus causing rapid deterioration of the track and uneven running when the vehicle is operated.

The primary object of the invention, therefore, is to provide an inflatable pneumatic track in which the base portion is substantially inextensible longitudinally and in which the portion of the track above the base is readily extensible so that the neutral axis of the track will necessarily be close to the base of the track.

Another object of the invention is to provide a pneumatic type track of novel construction which is capable of withstanding high inflation pressures and capable of operation at high speeds under heavy loads for sustained periods of time, but which at the same time is extremely flexible so that it can be used on wheels of comparatively small diameters.

A still further object is to provide a pneumatic track having a comparatively flat wide tread and a comparatively small overall cross sectional height.

Another object is to provide a pneumatic track having a plurality of parallel tubular air chambers interconnected in a novel manner to permit inflation thereof from a single valve.

To accomplish the above advantages, the track of the present invention includes one or more endless, flexible, inflatable tubes. A rubber cover surrounds the tubes and provides tread, side wall and base portions. Substantially inextensible, flexible, reinforcing cords of either metal or textile are embedded in the base portion of the cover. These reinforcing cords extend in a substantially longitudinal direction to thereby render the base portion substantially inextensible in a longitudinal direction so that the track will tightly grip the spaced wheels upon which it is used and so the track can be properly tensioned to perform its load-supporting function in the unsupported portion thereof between the wheels.

Substantially inextensible, flexible, reinforcing cords are also provided around each tube and when more than one tube is used, reinforcing cords are also provided around the tubes as a group to tie them together. The reinforcing cords surrounding the tubes restrain the tubes against radial expansion. In contrast to conventional tire building practice in which body reinforcing cords are positioned to extend at approximately 45 degrees to the longitudinal axis of the carcass, the reinforcing cords surrounding the tubes of the track of the present invention are positioned to extend at between 60 to 90 degrees to the longitudinal axis of the track. As so positioned, these cords restrain the tubes against radial expansion, but offer substantially no resistance to longitudinal stretching so that the portion of the track above the base is, therefore, readily extensible in a longitudinal direction and the track may easily bend in passing around the spaced wheels of the vehicle.

The tubes, cover and reinforcing cords are bonded together by vulcanization to form an integral unit. When two or more tubes are used, the reinforcing cords surrounding the tubes being bonded to the base and tread portions tie the tread and base portions together and prevent outward bulging of the tread upon inflation of the tubes, thereby permitting a track construction having a comparatively wide flat tread and comparatively small overall height. Interconnecting grommets are provided between adjacent tubes to permit inflation thereof from a single valve. In contrast to conventional tire construction practice, the reinforcing cords are not cut to accommodate either the grommets or the valve but rather the reinforcing cords are spread apart in the region of the grommets and valve to allow the grommets and valve to extend therethrough, thereby providing a much stronger construction. This spreading apart of the reinforcing cords rather than cutting the cords to accommodate the grommets and valve also increases the effective bond to the grommets and tubes and thereby minimizes the possibility of leakage of air from the tubes in this region.

Other objects and advantages of the present invention will become apparent from the following description when read in conjunction with the accompanying drawings wherein.

Figure 3:
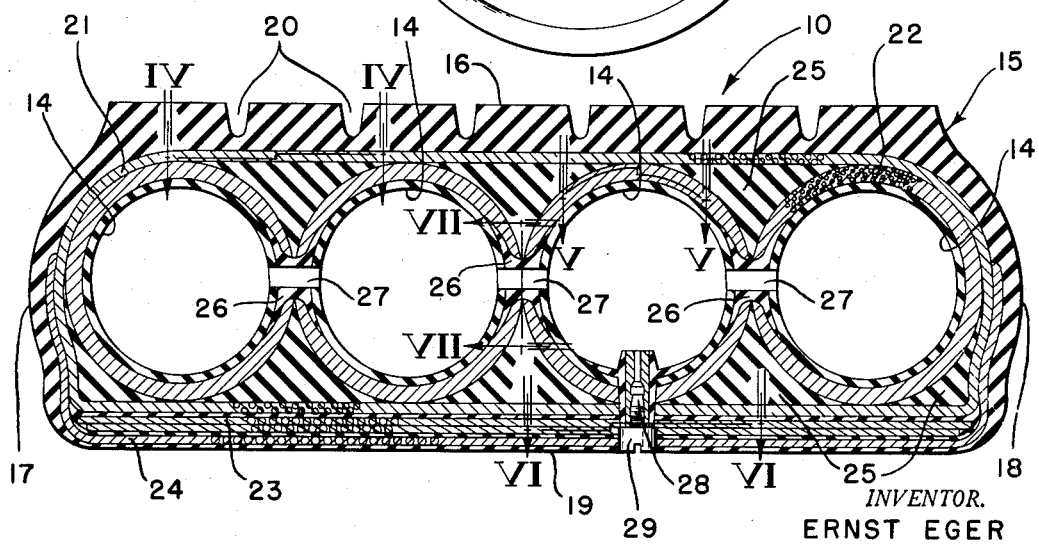
Fig. 3 is a sectional view taken on the line III—III of Fig. 2, showing the details of the construction of the track of the present invention.
Figure 6:
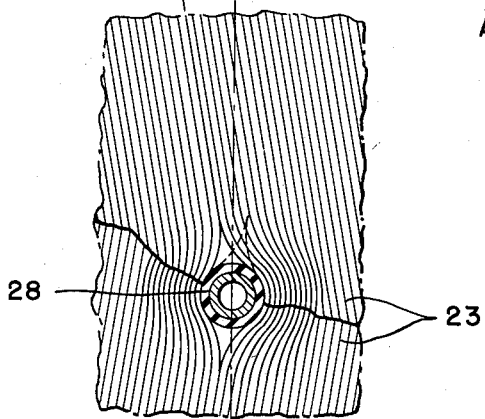
Figure 7:
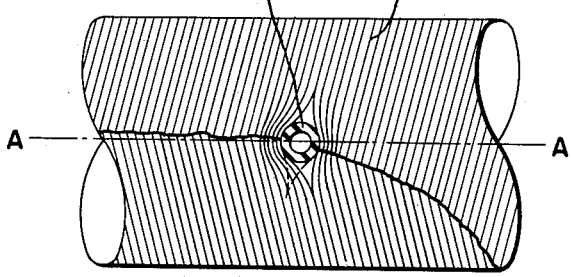

Fig. 6 is a sectional view taken on the line VI—VI of Fig. 3 showing the disposition of the reinforcing cords in the base portion of the track of the present invention and showing how the cords are spread apart to accommodate the valve stem; and Fig. 7 is a sectional view taken on the line VII—VII of Fig. 3 showing how the reinforcing cords are spread apart to accommodate the interconnecting grommets between the inflatable tubes.

Figure 1:
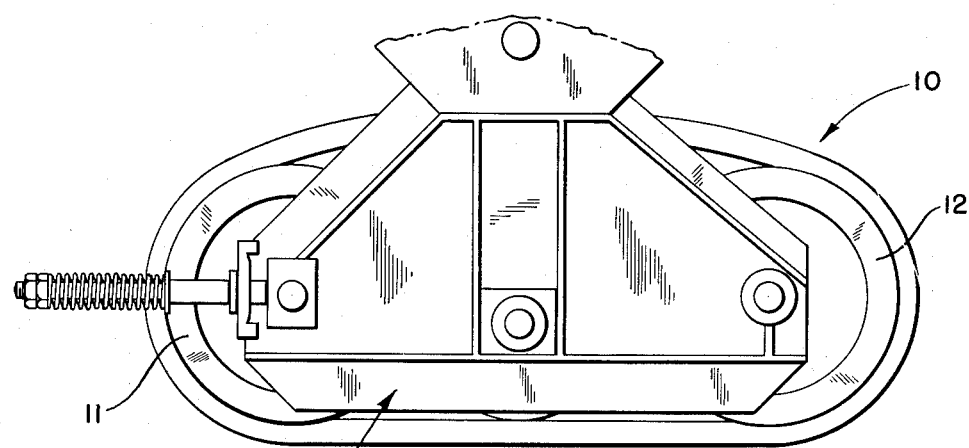
Fig. 1 is an elevational view of a track carriage for a vehicle showing the pneumatic track of the present invention installed thereon.

Referring to the drawings and in particular to Fig. 1 of the drawings there is shown a typical installation of the pneumatic track of the present invention. The track, generally designated by the reference numeral 10, is shown trained around two spaced flanged wheels 11 and 12 of a track carriage for a vehicle, generally designated by the reference number 13. This carriage 13 forms no part of the present invention and is merely shown to illustrate a typical installation of the pneumatic track of the present invention.

Figure 2:
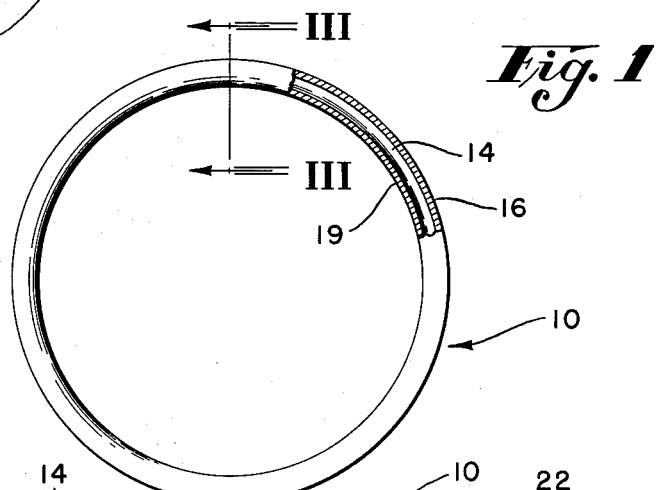
Fig. 2 is an elevational view, partly in section, of an unmounted track made according to the present invention.

As shown in Fig. 2, the track 10 is in the form of an endless belt which prior to being installed on the space wheels 11 and 12 is of a generally annular shape. As shown in Fig. 3, the track 10 includes a number of endless longitudinally extending, inflatable, elastic rubber tubes 14 of circular cross-section positioned in side-by-side parallel relationship. In Fig. 3, four tubes are shown but it is to be understood that a greater or lesser number of tubes could be used as desired. The term "rubber" is used above and hereafter in its generic sense to include natural or synthetic rubber and plastic materials or blends thereof exhibiting rubber-like properties.

An elastic rubber covering generally designated by the reference numeral 15 surrounds the tubes 14 and provides a tread portion 16, side wall portions 17 and 18 and a base portion 19. Anti-skid grooves 20 may be provided in the tread portion 16 if desired. Two plies of substantially inextensible flexible reinforcing cords 21 extend around the tubes 14 as a group and four plies of substantially inextensible, flexible reinforcing cords 22 extend circumferentially around the individual tubes 14. Two plies of substantially inextensible, flexible reinforcing cords 23 are embedded in the base portion 19 of the cover 15 and a chafing strip 24 extends along the base portion 19 and part of the way up each of the side wall portions 17 and 18. Reinforcing cords 21, 22 and 23 may be either metal or textile and if textile may be either natural or synthetic. Elastic rubber filler strips 25 occupy the spaces between the tubes 14 and the cover 15 and serve to position the tubes 14.

Flanged rubber grommets 26 bonded at each end to adjacent tubes 14 provide passageways 27 interconnecting the adjacent tubes 14 so that all tubes may be inflated from a single valve 28 carried by one of the tubes. Instead of providing grommets 26 between all the tubes 14, grommets may be provided between two or more tubes and a separate inflating valve provided for each group of tubes so grommeted together. The advantage of this structure would be that the track would be divided into several independent pneumatic chambers so that the track could be used for temporary operation with one or more of the chambers deflated. Valve 28 extends through the base portion 19 and the end thereof is recessed so that a cap 29 when screwed thereon does not extend beyond the outer surface of the base portion 19. Tubes 14, reinforcing cords 21, 22 and 23, chafing strip 24 and filler strips 25 are bonded together by vulcanization to form an integral unit.

Figure 4:
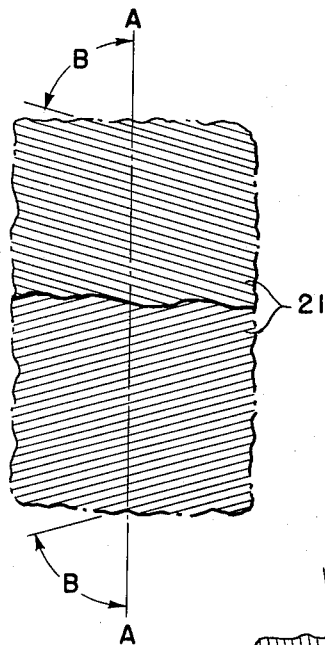
Fig. 4 is a sectional view taken on the line IV—IV of Fig. 3, showing the disposition of the reinforcing cords surrounding the inflatable tubes as a group.
Figure 5:
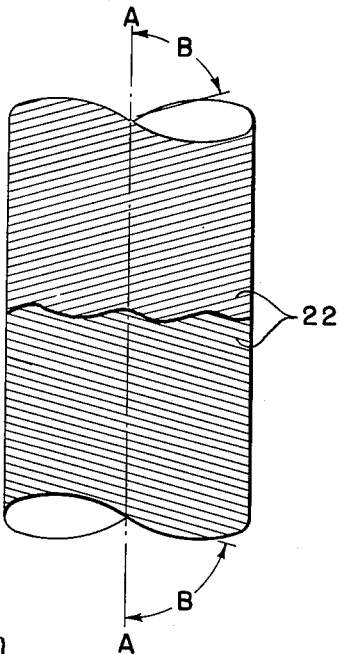
Fig. 5 is a sectional view taken on the line V—V of Fig. 3, showing the disposition of the reinforcing cords surrounding the individual inflatable tubes.

Referring to Figs. 4, 5 and 6 there is shown the novel disposition of the various reinforcing cords 21, 22 and 23 which renders the track extremely flexible so that it will readily bend in passing around the spaced wheels 11 and 12. As shown in Figs. 4 and 5, the reinforcing cords 21 are wrapped circumferentially around the tubes 14 as a group at an angle of substantially 90 degrees to the longitudinal axis of the tubes 14 and reinforcing cords 22 are wrapped circumferentially around the individual tubes 14 at an angle of substantially 90 degrees to the longitudinal axis of the tubes 14. Line A—A in Figs. 4, 5, 6 and 7 represents a line parallel to the longitudinal axis of the tubes 14 or track 10. It can be seen therefore, that while cords 21 tie the tubes together and cords 22 restrain the individual tubes 14 against radial expansion, that neither cords 21 nor 22 restrain the track against longitudinal stretching. The portion of the track 10 above the base 19 is, therefore, free to stretch longitudinally and can readily flex in passing around the spaced wheels 11 and 12.

Preferably from a theoretical standpoint, it would be desirable to have the cords 21 and 22 extend at exactly 90 degrees to the longitudinal axis of the track but from the practical viewpoint of fabrication it may be desirable to lay them at an angle of slightly less than 90 degrees. Good results have been obtained when the angle indicated by the dimension B in Figs. 4 and 5 is held to between the limits of from 60 degrees to 90 degrees. When so laid at less than 90 degrees, the adjacent plies may be criss-crossed as shown in Figs. 4 and 5.

The cords 21 and 22 also serve to tie the tread portion 16 to the base portion 19 so that the tread portion 19 will not bulge outwardly when the tubes 14 are inflated, thereby permitting a construction as shown in Fig. 3 of a track having a comparatively wide flat tread and a comparatively small overall height.

As shown in Fig. 6, the reinforcing cords 23 in the base portion 19 are laid to extend substantially parallel to the longitudinal axis of the track to thereby render the base portion 19 substantially inextensible in a longitudinal direction so that the neutral axis of the track will be in the base of the track. A square woven fabric may be used for this purpose in which case the warp threads or cords thereof would be laid substantially parallel to the longitudinal axis of the track. Good results are obtained if the angle between the cords and the longitudinal axis of the track are indicated by dimension C is maintained between 0 degrees and 20 degrees. When so laid at a small angle to the longitudinal axis, the adjacent plies may be criss-crossed as shown in Fig. 6.

Instead of cutting the reinforcing cords 21, 22 and 23 to accommodate the grommets 26 and the valve 28 as is conventional practice, the cords are spread apart as shown in Figs. 6 and 7 to permit the grommets 26 and valve 28 to extend therethrough. This provides at least two important advantages. First, it eliminates the weakening of the track which would result from cutting the cords and second the bunching up of the cords 22 on each side of the grommet 26, as shown in Fig. 7, provides additional pressure on the flanges of the grommets and increases the effective bond between the grommets 26 and the tubes 14 and thereby minimizes its possibility of leakage of air from the tubes 14 in these regions. This construction therefore enables the tire to withstand higher inflating pressure and therefore larger operating loads.

The chafing strip 24 may be a woven textile fabric and may be either straight-laid or biased-laid as it extends up from the base 19 only a comparatively small distance and therefore offers very little resistance against longitudinal stretching.

From the above description it can be seen that there is provided an inflatable pneumatic track which is extremely flexible and therefore, may be used on wheels of comparatively small diameter. The disposition of the reinforcing cords in the base render the base substantially inextensible longitudinally so that the track may be properly tensioned to tightly grip the wheels of the vehicle on which it is used and so that the track may perform its load-supporting function in the unsupported portion thereof between the wheels. The novel disposition of the reinforcing cords around the tubes restrain the tubes against radial expansion but offers substantially no resistance against longitudinal stretching so that the portion of the track above the base may stretch to allow the track to readily bend in passing around the wheels of the vehicle on which the track is used. This novel disposition of the reinforcing cords in the base and around the tubes insures that the neutral axis of the track will be in the base of the track. The reinforcing cords around the individual tubes tie the tread and base portions together thereby permitting a construction having a relatively flat, wide tread and a comparatively small overall height. The novel disposition of the reinforcing cords, therefore, permits the use of a heavy, strong construction capable of withstanding high inflation pressures and heavy loads without sacrifice in flexibility.

It is to be understood that the above description and accompanying drawings are for the purpose of illustration only and not by way of limitation and changes or modifications may be made therein without departing from the spirit and the scope of the invention.

Having thus described my invention, what I claim and desire to protect by Letters Patent is:

1. An inflatable endless track comprising, an endless rubber tube, a rubber cover surrounding said tube providing tread, side wall and base portions, substantially inextensible flexible, reinforcing cords embedded in the base portion of said cover, said reinforcing cords in said base portion extending in a substantially lonigtudinal direction to thereby render the base portion substantially inextensible in a longitudinal direction, substantially inextensible, flexible, reinforcing cords extending circumferentially around said tube at an angle of between 60 and 90 degrees to the longitudinal axis of the tube whereby said reinforcing cords restrain the tube against radial expansion without restraining the track against longitudinal stretching and means for inflating said rubber tube.

2. An inflatable endless track, comprising, a plurality of endless rubber tubes positioned in side-by-side parallel relationship, a rubber cover surrounding said tubes providing tread, side wall, and base portions, substantially inextensible, flexible, reinforcing cords embedded in the base portion of the cover, said reinforcing cords extending in a substantially longitudinal direction to thereby render the base portion substantially inextensible in a longitudinal direction, substantially inextensible, flexible, reinforcing cords extending circumferentially around each of said tubes at an angle of between 60 and 90 degrees to the longitudinal axis of the tubes to thereby retain the tubes against radial expansion without restraining the track against longitudinal stretching, said tubes, cover and reinforcing cords being bonded together to form an integral unit, and means for inflating said tubes.

3. An inflatable endless track comprising, a plurality of endless rubber tubes positioned in side-by-side parallel relationship, a rubber cover surrounding said tubes providing tread, side wall and base portions, substantially inextensible, flexible, reinforcing cords embedded in the base portion of the cover, said reinforcing cords extending in a substantially longitudinal direction to thereby render the base portion substantially inextensible in a longitudinal direction, substantially inextensible, flexible reinforcing cords extending circumferentially around each of said tubes and around said tubes as a group at an angle to the longitudinal axis of the tubes of between 60 and 90 degrees to thereby restrain the tube against radial expansion without materially restraining the track against longitudinal stretching, said tubes, cover and reinforcing cords being bonded together to form an integral unit, and means for inflating said tubes.

4. An inflatable endless track comprising, an endless rubber tube, a rubber cover surrounding said tube providing tread, side wall, and base portions, substantially inextensible flexible reinforcing cords embedded in the base portion of said cover, said reinforcing cords in said base portion extending in a substantially longitudinal direction to thereby render the base portion substantially inextensible in a longitudinal direction, substantially inextensible flexible reinforcing cords extending circumferentially around said tube at substantially 90 degrees to the longitudinal axis of the tube to thereby restrain the tube against radial expansion without restraining the track against longitudinal stretching, a valve secured to said tube and extending through said base portion by which said tube may be inflated, said reinforcing cords in said base portion being spread apart in the region of said valve to allow the valve to extend therethrough.

5. An inflatable endless track comprising, a plurality of endless rubber tubes positioned in side-by-side parallel relationship, a rubber cover surrounding said tubes providing tread, side wall and base portions, substantially inextensible flexible reinforcing cords embedded in the base portion of the cover, said reinforcing cords extending in a substantially longitudinal direction to thereby render the base portion substantially inextensible in a longitudinal direction, substantially inextensible, flexible, reinforcing cords extending circumferentially around each of said tubes at an angle of between 60 and 90 degrees to the longitudinal axis of the tubes to thereby restrain the tubes against radial expansion without restraining the track against longitudinal stretching, said tubes, cover, and reinforcing cords being bonded together to form an integral unit, grommets bonded to and extending between at least two adjacent tubes, said reinforcing cords surrounding said adjacent tubes being spaced apart in the region of said grommets to allow the grommets to extend therethrough, said grommets providing interconnecting passageways between said adjacent tubes whereby said adjacent tubes may be inflated by the introduction of fluid under pressure into one of said adjacent tubes, and means for introducing fluid under pressure into said tubes.

6. An inflatable endless track comprising, a plurality of endless rubber tubes positioned in side-by-side parallel relationship, a rubber cover surrounding said tubes providing tread, side wall and base portions, substantially inextensible flexible reinforcing cords embedded in the base portion of the cover, said reinforcing cords extending in a substantially longitudinal direction to thereby render the base portion substantially inextensible in a longitudinal direction, substantially inextensible, flexible, reinforcing cords extending circumferentially around each of said tubes at an angle of between 60 and 90 degrees to the longitudinal axis of the tubes to thereby restrain the tubes against radial expansion without restraining the track against longitudinal stretching, said tubes, cover and reinforcing cords being bonded together to form an integral unit, grommets bonded to and extending between at least two adjacent tubes, said reinforcing cords surrounding said adjacent tubes being spread apart in the region of the grommets to allow the grommets to extend therethrough, said grommets providing interconnecting passageways between said adjacent tubes whereby said adjacent tubes may be inflated by the introduction of fluid under pressure into one of said adjacent tubes, at least one valve secured to and extending from one of said tubes through said base portion by which fluid under pressure may be introduced into said tubes, said reinforcing cords around said tubes as a group and in said base portion being spread apart in the region of the valve to allow the valve to extend therethrough.

References Cited in the file of this patent

UNITED STATES PATENTS

| | | |
|---|---|---|
| 750,633 | Fiske | Jan. 26, 1904 |
| 1,057,232 | Gammeter | Mar. 25, 1913 |
| 1,679,444 | Pagenhart | Aug. 7, 1928 |
| 1,783,091 | Leupold | Nov. 25, 1930 |
| 2,063,105 | King | Dec. 8, 1936 |
| 2,194,635 | Bronson | Mar. 26, 1940 |
| 2,365,279 | Kraft | Dec. 19, 1944 |
| 2,476,828 | Skromme | July 19, 1949 |